US009686079B2

(12) United States Patent
Raduchel

(10) Patent No.: US 9,686,079 B2
(45) Date of Patent: Jun. 20, 2017

(54) ELECTRONIC DOCUMENT NOTARIZATION

(71) Applicant: eIngot LLC, Great Falls, VA (US)

(72) Inventor: William J. Raduchel, Palo Alto, CA (US)

(73) Assignee: eIngot LLC, Great Falls, VA (US)

( * ) Notice: Subject to any disclaimer, the term of this patent is extended or adjusted under 35 U.S.C. 154(b) by 505 days.

(21) Appl. No.: 14/247,370

(22) Filed: Apr. 8, 2014

(65) Prior Publication Data

US 2015/0026478 A1   Jan. 22, 2015

Related U.S. Application Data

(60) Provisional application No. 61/846,688, filed on Jul. 16, 2013.

(51) Int. Cl.
*H04L 9/32* (2006.01)
*G06F 21/62* (2013.01)
*G06F 21/31* (2013.01)

(52) U.S. Cl.
CPC ........ *H04L 9/3247* (2013.01); *G06F 21/6272* (2013.01); *G06F 21/31* (2013.01); *H04L 2209/56* (2013.01)

(58) Field of Classification Search
CPC . H04L 9/3247; H04L 2209/56; H04L 67/306; G06F 21/31; G06F 21/6272
USPC .......................................................... 713/178
See application file for complete search history.

(56) References Cited

U.S. PATENT DOCUMENTS

2013/0325728 A1*   12/2013   Bialostok ............... G06Q 50/18
                                                    705/311

* cited by examiner

*Primary Examiner* — Tu Nguyen
(74) *Attorney, Agent, or Firm* — Fish & Richardson P.C.

(57) ABSTRACT

A server receives a package of data including: a document designated for notarization, identification information including a photograph, photograph of a user, and a signature of the user. The server compares the photograph of the user to the photograph included with the identification information. Next, the server verifies an identity of the user based on the identification information and the photograph by comparing the photograph of the signer to the photograph included with the identification information. The server then applies the signature and an indication of notarization to the document designated for notarization to create a notarized version of the document. The server stores the notarized version of the document, the photograph, and the identification document in a secure data package, and provides the notarized version of the document to the user.

20 Claims, 6 Drawing Sheets

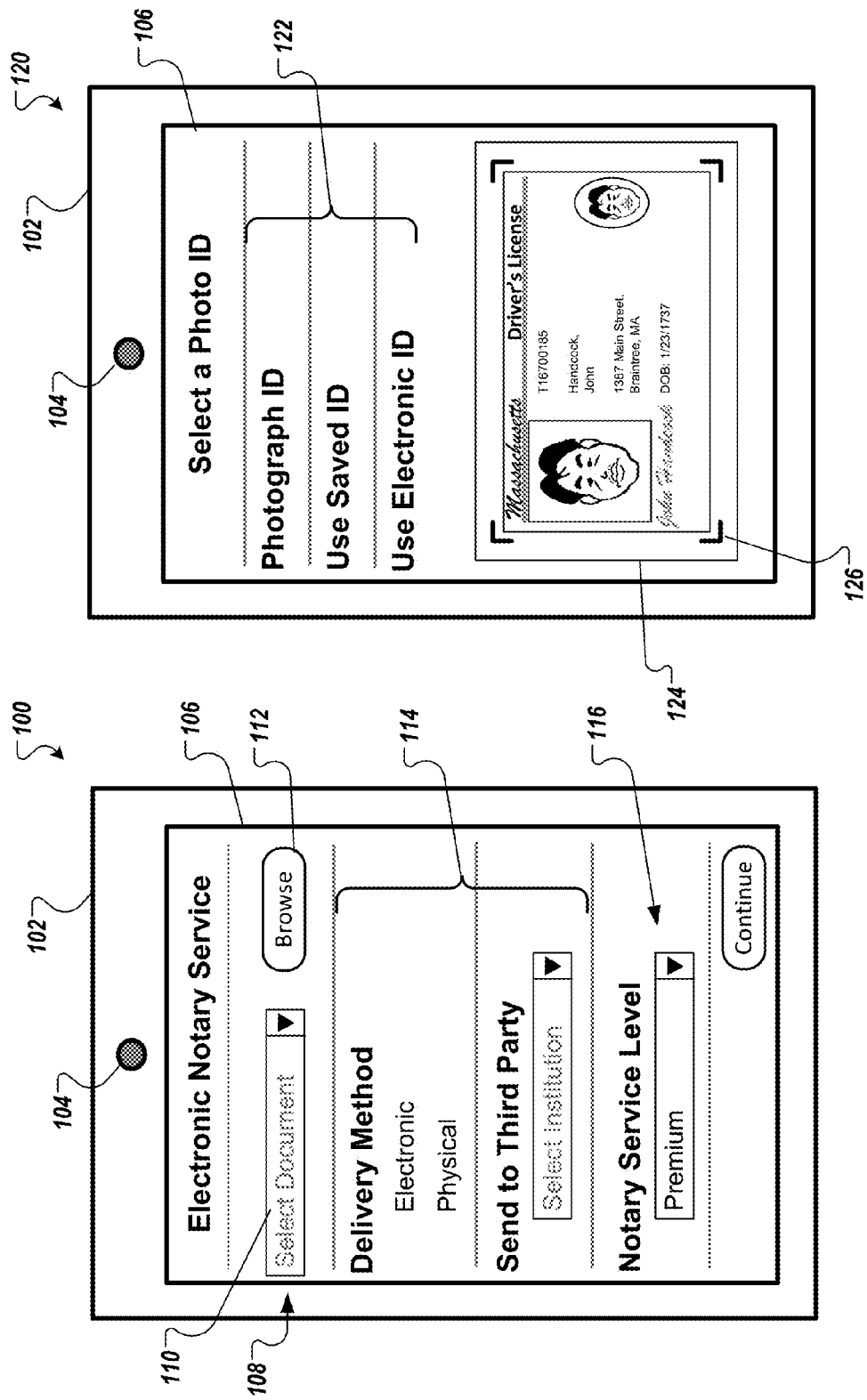

ELECTRONIC DOCUMENT NOTARIZATION

CROSS REFERENCE TO RELATED APPLICATIONS

This application claims the benefit of the filing date of U.S. Provisional Application No. 61/846,688, which was filed on Jul. 16, 2013. The contents of U.S. Application No. 61/846,688 are incorporated by reference in its entirety as part of this application.

TECHNICAL FIELD

This specification generally relates to electronic document notarization.

BACKGROUND

A person may wish to have a document notarized while traveling or after normal business hours. If the person is traveling, they may only have an electronic copy of the document on a computer or mobile device without access to a printer. This can be a stressful and possibly costly situation when the document must be signed and notarized to, for instance, meet a last minute deadline.

SUMMARY

One aspect of the subject matter described in this specification may include a server receiving a package of data including: a document designated for notarization, identification information including a photograph, photograph of a user, and a signature of the user. The server compares the photograph of the user to the photograph included with the identification information. Next, the server verifies an identity of the user based on the identification information and the photograph by comparing the photograph of the signer to the photograph included with the identification information. The server then applies the signature and an indication of notarization to the document designated for notarization to create a notarized version of the document. The server stores the notarized version of the document, the photograph, and the identification document in a secure data package, and provides the notarized version of the document to the user.

Implementations can include one or more of the following features. For example, the package of data may include location data. The package of data may include a video. The package of data may be encrypted. The package of data may include a digital postmark.

The server may access ID validation information from a database, and determine that the identification information is valid. The database may be a government issued ID database. The database may be a social networking platform.

The indication of notarization may include an indication of a level of certification. The server may provide the notarized version of the document to at least one third-party.

In another aspect of the subject matter described in this specification a computing device receives a document designated for notarization and identification information including a photograph. The computing device activates a camera on the computing device, and prompts a user of the computing device to center an image displayed on the computing device from the camera on the user and to sign on a touch input of the computing device. The computing device captures a photograph of the user and a signature of the user. The computing device then sends the document designated for notarization, the identification information, the photograph of the user, and the signature of the user to a server for notarization.

Implementations can include one or more of the following features. For example, the identification information may be a photograph of a photo identification document. The computing device may record a video of the user. The computing device may request a word from the server, and when prompting the user of the computing device to center an image displayed on the computing device from the camera on the user and to sign on a touch input of the computing device, the computing device may also prompt the user to write the word on the touch input of the computing device.

The computing device may present at least one document notarization option, receive a selection of an option, and send data indicating the selected option to the server. One of the at least one options may be an option to choose a level of service. The details of one or more implementation of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 1A-1D illustrate exemplary user interfaces for an electronic notarization application on a mobile device.

Like reference symbols in the various drawings indicate like elements.

DETAILED DESCRIPTION

Figure 1D:
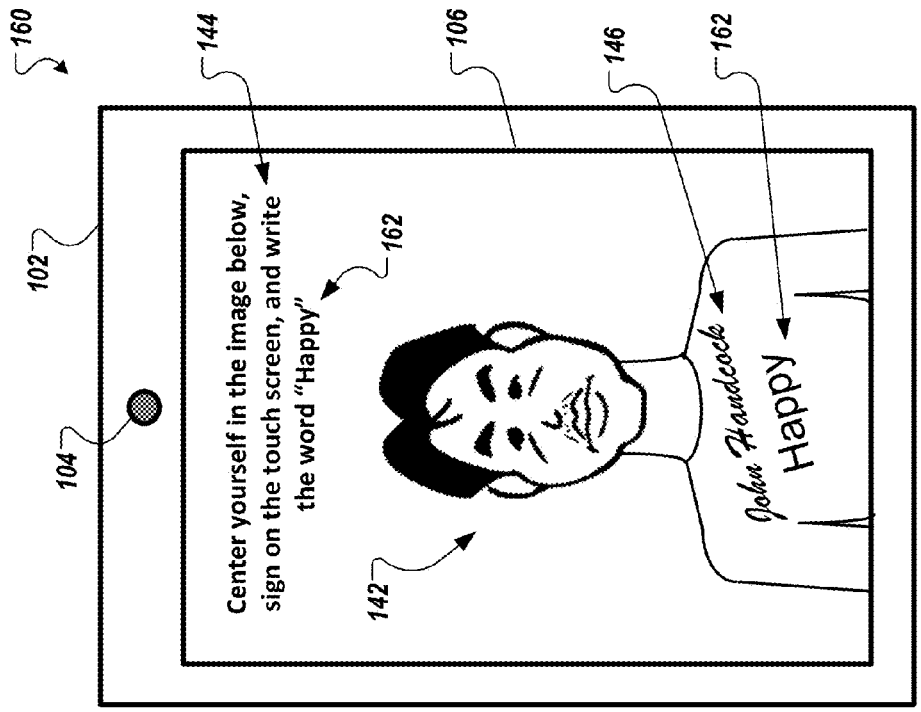

Techniques are provided for electronic notarization of a document using a mobile device. For example, implementations of an electronic notarization application may allow a user to get an important document notarized at any time of the day and from any location in certain circumstances. In addition, the electronically notarized documents may be archived in computer databases allowing for quick retrieval in the event that a user's copy is lost or destroyed. Notarized documents may be transmitted and archived with a digital postmark for nonrepudiation.

The details of one or more embodiments of the invention are set forth in the accompanying drawings and the description below. Other features, objects, and advantages of the invention will be apparent from the description and drawings, and from the claims.

The mobile device is configured to exchange electronic communications with other computing devices through a network, to take photographs, and to receive touch input. The mobile device receives a user input to launch a notarization application. The notarization application generates a user interface allowing the user to designate a document for notarization and choose from several options related to notarizing the document. The mobile device receives a document designated for notarization. Next, the application may prompt the user for an identification document (e.g., a photo identification such as a driver's license). The application then may allow the user to take a photograph of the user's identification document with the mobile device. Next, the application may request a photograph of the user and the user's signature. The application may activate a camera on the mobile device and prompt the user to center themself in an image generated on the mobile device by the camera and to sign on the touch input of the mobile device. The mobile device may capture a photograph of the user and the user's signature. The notarization application may then send the designated document, the user's identification document, the user's photograph, and the user's signature to a notary server.

A notary server may include one or more computing devices connected to a computer network such as a group of servers in a datacenter connected to the internet. The notary server may receive the designated document, the user's identification document, the user's photograph, and the user's signature from the mobile device. The notary server may then compare the user's photograph to a photograph on the identification document to verify the identity of the user in the photograph. The comparison may be performed using image and/or facial recognition software on the notary server, for example. If the notary server successfully verifies the identity of the user in the photograph, the notary server then may apply the user's signature and an indication of notarization to the designated document. The now notarized document may be archived in a notary database along with the photograph and the identification document in a secure data package, for example, by encrypting the data package, storing the data package with a trusted time stamp (e.g., a digital postmark), and/or storing the data package with a digital signature. The notary server then returns the notarized document to the user. The notary server may send an electronic copy of the document to the user's mobile device, for example, through the notary application and/or via e-mail. Alternatively or in addition, the notary server may transmit the notarized document to a document delivery service for delivery of a physical copy of the notarized document to the user.

In some implementations, the notary application may offer the user several levels of notarization services. Higher levels of service may provide higher levels of document certification. For instance, a premium level of service may verify the validity of the identification document by comparing the identification document with data in a government database (e.g., a state Department of Motor Vehicles database) and requiring a person (e.g., a notary public working at a datacenter) to compare the photograph of the user with the identification document on a display connected to the notary server. Conversely, a basic level of service may not compare the identification document with the photograph of the user and may simply store the documents for retrieval at a later date in the event that validity of the document is contested, for example. Furthermore, the indication of notarization may include data indicating the certification level of the document.

FIGS. 1A-1D illustrate exemplary user interfaces for an electronic notarization application on a mobile device 102. Mobile device 102 includes a camera 104 and a touch input 106. Mobile device 104 is configured to capture photographs using camera 104 and, in some implementations, may be configured to capture video. Touch input 106 may be a touch screen (as illustrated), a touch pad, or a digital pen, for example. In addition, mobile device 102 is configured to exchange electronic communications with other computing devices through a network (e.g., a cellular network, a WAN, etc). The mobile device 102 may be any mobile device configured to exchange electronic communications over a network. For example, the mobile device 102 may be a wireless phone, a cellular phone, a mobile personal digital assistant (PDA) with embedded cellular phone technology, a smart phone, a tablet computer, or a laptop computer.

The user interface 100 in FIG. 1A may be presented to a user who needs to electronically notarize a document. The user interface 100 may be generated by a mobile device or a service provider providing service to the mobile device. Additionally, user interface 100 may allow the user to select several options for notarizing a document.

The user interface 100 includes a document selection portion 108 and may include a delivery method selection portion 114 and/or a notary service level selection portion 116. The document selection portion 108 of the user interface 100 allows a user to designate a document for notarization. The document may be stored on the mobile device or attached to an e-mail received by the mobile device. Alternatively or in addition, the documents may be stored by a cloud storage provider (e.g., DropBox, Mozy, Carbonite, etc.), or on another computing device (e.g., the user's desktop computer) and accessible by the mobile device through a computer network. The document selection portion 108 may include a dropdown menu 110, for example, to access documents contained in a designated location (e.g., a folder in cloud storage). The document selection portion 108 also may include a "browse" button 112 to allow the user to navigate to the document. In some implementations, the user interface 100 may provide an option of photographing the document designated for notarization using camera 104 on mobile device 102.

The user interface 100 also may include a delivery method selection portion 114. The delivery method selection portion may allow the user to select a preferred delivery method for the document after it is notarized. For example, the notarized document may be delivered to the user electronically through the notarization application, e-mailed to the user's e-mail account, or both. Alternatively or in addition, a physical copy of the notarized document may be delivered via a document delivery service (e.g., UPS or FedEx). The delivery method selection portion 114 also may allow the user to have the notarized document delivered to a third-party, for example, a bank, a law firm, or a trust company.

Upon receipt of a user selection to deliver the notarized document to a third-party, the notarization application may request information related to the third-party, for example, a physical address or an e-mail address. In some implementations, delivery information for common recipients of notarized documents (e.g., banks) may be stored by the notarization application and allow the user to choose the third-party recipient from a menu. In some implementations, the notarization program itself may be integrated into a particular third-party recipient's own customer account software, for example, a bank's online account access website or a mobile banking application. In such an implementation, the particular third-party recipient may be a default recipient for notarized documents.

The user interface 100 also may include a notary service level selection portion 116. The notary service level selection portion 116 may allow a user to select from various service levels corresponding to differing levels of certification, for example, the certification levels may range from a basic level to a premium level and be priced accordingly. (Exemplary levels of service are described in more detail below in reference to FIG. 2.)

Once the user has designated a document for notarization and chosen notarization preferences the user interface 120 in FIG. 1B may be displayed to the user prompting the user for an identification document. The user interface 120 may include an ID selection portion 122, a photograph alignment portion 124 or both, for example. The ID selection portion 122 may allow a user to select a method of accessing an identification document. For example, the user may photograph an identification document using the mobile device 102, the user may have a previously stored photograph of the identification document on the mobile device, or the user may have an electronic identification document (e.g., an eID or EIC). If the user selects to photograph an identification document, the notarization application may activate the camera 104 on the mobile device 102 (e.g., the mobile device 102 may have a second camera on the reverse side) and display an image from the camera in the photograph alignment portion 124. Photograph alignment portion 124 may include alignment marks 126 (e.g., a reticle) to aid in proper alignment of the identification document.

Figure 1C:
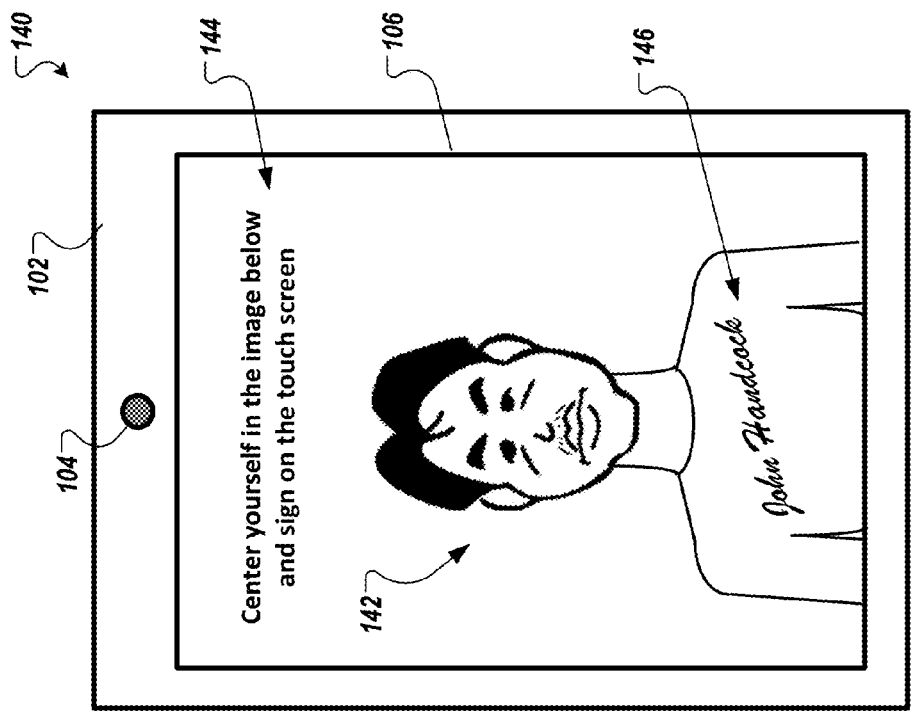

Once the user has selected an identification document, the notarization application may activate the camera 104 on the mobile device 102 and display user interface 140 in FIG. 1C. User interface 140 includes an image 142 of the user from the camera 104 and a prompt 144 for the user to sign on a touch input 106 of the mobile device 102. The prompt 144 may be displayed in conjunction with the camera image 142 or prior to activating the camera 104. Additionally, the prompt 144 may instruct the user to center the camera image 142 on themselves and to provide an input (e.g., tap the touch input 106 or press a button on the mobile device 102) to capture a photograph of the user. As the user signs on the touch input 106 the user's signature 146 may be displayed over the user's image 142 on the mobile device 102, for example. The notarization application may then send the designated document, the user's identification document, the user's photograph, and the user's signature to a notary server for verification and notarization.

In some implementations, the notarization application may request that the user record a video of the signing process. In such an implementation, the notarization application may activate the camera 104 when it displays user interface 100 and record the user during the entire data input process described above. Because the image quality in a video is generally lower than that of a digital photograph, the notarization may capture the user's photograph separate from the video. The video would then be sent to the notary server and retained along with the designated document, the user's identification document, the user's photograph, and the user's signature.

In some implementations in which the user is requested to record a video, the notarization application also may request data from the notary server to verify contemporaneousness of the video recorded signature and the photograph. For example, the server may generate a random word 162 that the application can require a user to write along with their signature 146 as illustrated by user interface 160 in FIG. 1D. In some implementations the word may not be random. Instead the word may be one of an extensive list of words from which the notary server cycles through on regular time intervals. An algorithm may be applied to associate a particular word with a particular time or date.

Figure 2:
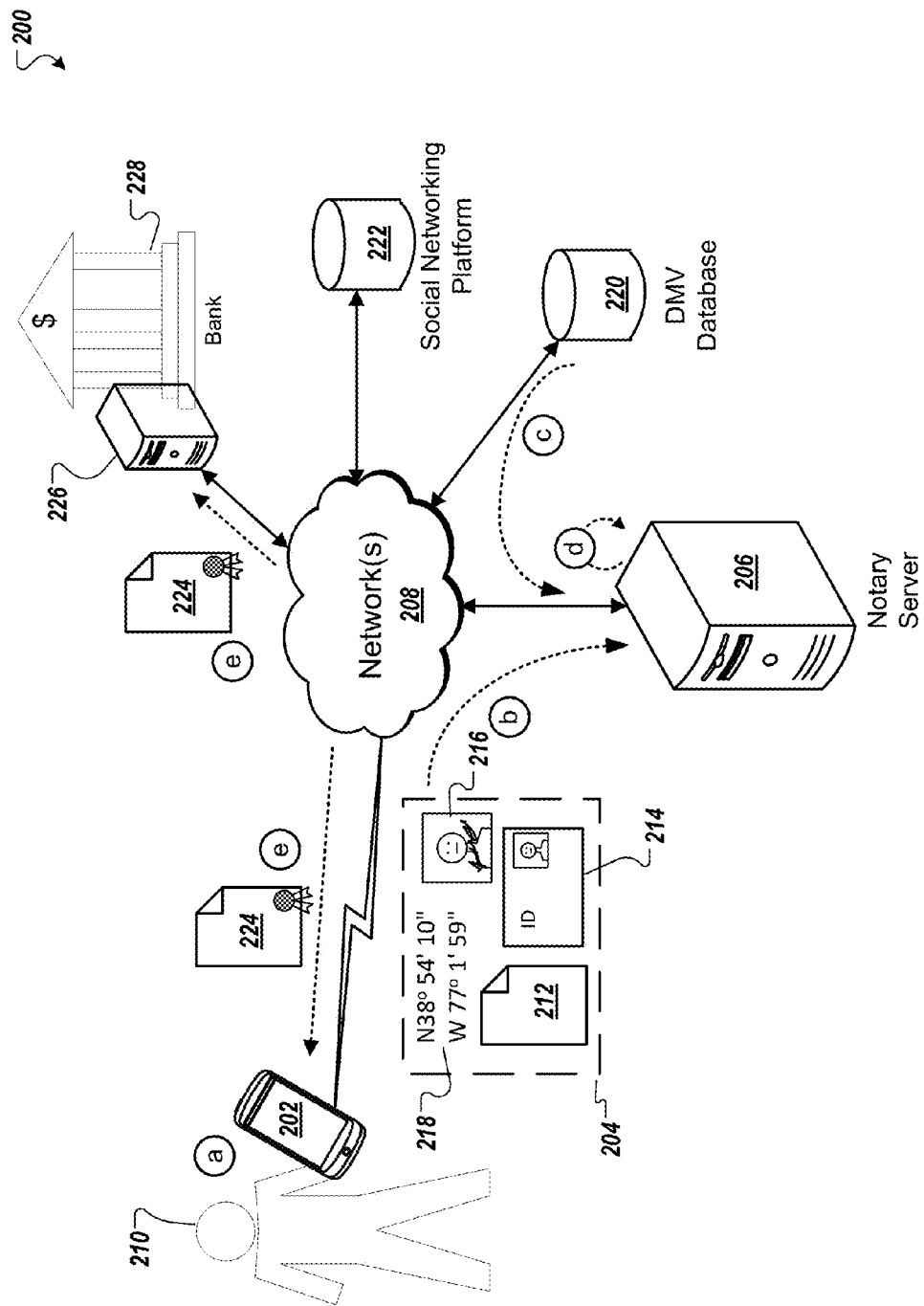
FIG. 2 is a diagram of an example system that employs an exemplary electronic notarization process.

FIG. 2 is a diagram of an example system 200 that employs an exemplary electronic notarization process. FIG. 2 also illustrates a flow of data within the system 200 during states (a) to (e). Briefly, mobile device 202 sends a notarization data package 204 to notary server 206. Notary server 206 uses data from the notarization data package 204 to verify a user's identity and notarizes a document include in the notarization data package 204 by applying the verified user's signature and an indication of notarization to a document. The notarized document is then returned to the user and optionally sent to a third-party.

In more detail, the system 200 includes mobile device 202 which is in communication with notary server 206 through network(s) 208. Network(s) 208 may include a wireless cellular network, a wireless local area network (WLAN) or Wi-Fi network, a Third Generation (3G) or Fourth Generation (4G) mobile telecommunications network, a private network such as an intranet, a public network such as the internet, or any appropriate combination thereof. The states (a) through (e) depict a flow of data that occurs when an example process is performed by the system 100. The states (a) to (e) may be time-sequenced states, or they may occur in a sequence that is different than the illustrated sequence. Furthermore, all states (a) through (e) may not be performed in some implementations.

During state (a), user 210 accesses a notarization application on mobile device 202. The notarization application on the mobile device 202 allows the user 210 to designate a document to be notarized 212, choose or photograph an identification document 214, take a photograph 216 of the user 210, and provide a signature. The notarization application may overlay the user's 210 signature onto the photograph 216. (The individual steps of state (a) are described in more detail above in relation to FIGS. 1A-1D.)

Then, during state (b), the notarization application sends the document designated for notarization 212, the identification document 214, and the photograph 216 of the user 210 in a notarization data package 204 to the notary server 206. In some implementations, the notarization application includes location data 218 (e.g., global positioning data) in the notarization data package 204. The location data 218 may indicate a geographic location of the mobile device 202 at a time when the user signed on the touch input of the mobile device 202, for example. In some implementations, the notarization data package 204 may be a secure data package, for example, by encrypting the data package, including a trusted time stamp (e.g., a digital postmark), and/or including a digital signature.

The notary server 206 receives the notarization data package 204. During state (c), the notary server 206 validates the identification document 214 submitted by user 210. The notary server 206 may access a database 220 to obtain data to validate the identification document 214. Database 220 may be, for example, a government database containing information related to government identification cards (e.g., a state Department of Motor Vehicles database). The notary server 206 may access data such as the user's 210 driver's license number, the user's 210 address, the user's 210 driver's license photograph, and/or an image of the user's driver's license, for example. The notary server 206 then may compare the accessed data to the identification document 214 to validate the authenticity of the identification document 214. Database 220 may contain information about other government issued identification documents, for example, a passport or any other federal or state issued identification documents.

In some implementations, the notary server 206 may access information about user 210 data from a social network server or database 222 during state (c). For example, the notary server 206 may access information from a user profile associated with user 210 in a social networking platform such as Facebook, LinkedIn, or Twitter, for example. Notary server 206 may then user the user profile information (e.g., an address, birthdate, or photograph) to verify information on the identification document 214 and validate the identification document 214. For example, if a birthdate obtained from the user's 210 profile within a social networking platform matches a birthdate on the identification document 214 then the identification document 214 is less likely to be a false ID. Alternatively or in addition, the notary server 206 may compare location information 218 to an address on the identification document 214 and hometown information obtained from the social networking platform to provide an indication of the validity of the identification document 214. For instance, if the location information 218, an address from the identification document 214, and hometown information or other similar information obtained from the social networking platform each (or two out of the three) identify locations which are significant distances apart there may be a greater likelihood that the identification document 214 is false.

During stage (d), the notary server 206 may compare a photograph on the identification document 214 with the photograph 216 of the user 210 to verify the user's 210 identity. For example, the notary server 206 may use facial recognition software to distinguish and compare facial features in each of the photographs. If the facial features of each photograph do not match within a predetermined range of similarity, the notary server 206 may decline to notarize the document designated for notarization 212 and send a notarization denial message to the mobile device 202. On the other hand, if the facial features in each of the photographs do match within the predetermined range of similarity, the notary server 206 may apply the user's signature and an indication of notarization to the document to be notarized 212, thereby notarizing the document. The indication of notarization may be an electronic seal or watermark, for example. The indication of notarization may include a thumbnail of the user's photograph 216, a date time stamp, and/or the location information 218 where the document was submitted for notarization.

In some implementations, the notarized document 224 may be archived in a notary database along with the photograph and the identification document in a secure data package, for example, by encrypting the data package, storing with a trusted time stamp (e.g., a digital postmark), and/or storing with a digital signature. In some implementations, the user 210 may record a video (as described above) showing the user 210 presenting the identification document 214 and signing on the mobile device 202. In such implementations the video also may be included in the archived secure data package.

In some implementations, the identification document 214 and user photograph 216 may be displayed on a display connected to the notary server and the user's 210 identity may be verified by a person. For example, an employee at a datacenter in may compare the user photograph 216 to the identification document 214 to verify the user's 210 identity. In some implementations, the employee may be a notary public.

In some implementations, the notarization application on the mobile device 202 may request from the notary server 206 data to verify the contemporaneousness of the user's signature with the user's photograph 216 during stage (a). As described above, the notary server 206 may respond to the request by providing a particular word for the user 210 to write in addition to the user's 210 signature. Therefore, the user identity verification of state (d) may include using handwriting recognition software to verify that the user 210 wrote the correct word.

Lastly, during stage (e), the notarized document 224 is sent to the user 210 and may also be sent to one or more third parties, such as, computing device 226 at a bank 228. The notarized document may be delivered to the user 210 and/or the third-party 228 electronically either through the notarization application or via e-mail. In some implementations, the notarized document 224 may sent electronically in a secure data package, for example, by encrypting the data package, including a trusted time stamp (e.g., a digital postmark), and/or including a digital signature. Alternatively or in addition, a physical copy of the notarized document 224 may be delivered to the user 210 and/or to one or more third parties 228 via a document delivery service.

In some implementations, if the notarized document 224 is sent to a third-party 228 a copy of the identification document 214 also may be sent to the third-party 228. In the case where the user 210 recorded a video, the video also may be provided to the third-party 228. The identification document 214 and/or the video may be sent to the third-party 228 by default or upon request by the third-party 228, for example.

As described above in reference to FIGS. 1A-1D, the notarization application may offer the user several levels of notarization services corresponding to levels of certification and priced accordingly. Several exemplary levels of certification are described ranging from a basic level to a premium level. The level of certification may be indicated, for example, by a code in the notarization indication on notarized documents. For the purposes of the discussion below, user submitted notarization data includes a photograph of the user (including the user's signature), an identification document, a notarized version of the document designated to be notarized, optionally location information of the mobile device when the document was submitted for notarization, and optionally a video recorded by the user of the user's submission of the notarization data.

A first, basic, exemplary level of certification may provide minimal assurance that a notarized document was in fact signed by a particular user, but may provide access to all of the notarization data in the event that validity of the notarized document is contested of the document is lost or destroyed. For example, the first exemplary level of certification may include only archiving the user submitted notarization data. Thus, the notary server would not verify the identity of the user prior to notarizing the document designated for notarization for the first level of certification.

A second exemplary level of certification may provide some assurance that a notarized document was in fact signed by a particular user and access to all of the notarization data in the event that the validity of the notarized document is contested or the document is lost or destroyed. For example, the second exemplary level of certification may include verifying the identity of the user by comparing the user's photograph and the identification document facial recognition software on the notary server in addition to archiving the submitted notarization data.

A third exemplary level of certification may provide additional assurance that a notarized document was in fact signed by a particular user and access to all of the notarization data in the event that the validity of the notarized document is contested of the document is lost or destroyed. For example, the third exemplary level of certification may include verifying both the validity of the identification document by accessing data from either a government database or a social networking platform and the identity of the user by comparing the user's photograph and the identification document facial recognition software on the notary server in addition to archiving the submitted notarization data.

A fourth, premium, exemplary level of certification may provide heightened assurance that a notarized document was in fact signed by a particular user and access to all of the notarization data in the event that the validity of the notarized document is contested of the document is lost or destroyed. For example, the fourth exemplary level of certification may include verifying the validity of the identification document by accessing data from either a government database or a social networking platform and verifying the identity of the user by comparing the user's photograph and the identification document facial recognition software both on the notary server and by an employee at a data center (e.g., a notary public) in addition to archiving the submitted notarization data.

Additional levels of certification may be conceived by inclusion of various combinations of elements of the electronic notarization process described herein.

Figure 3:
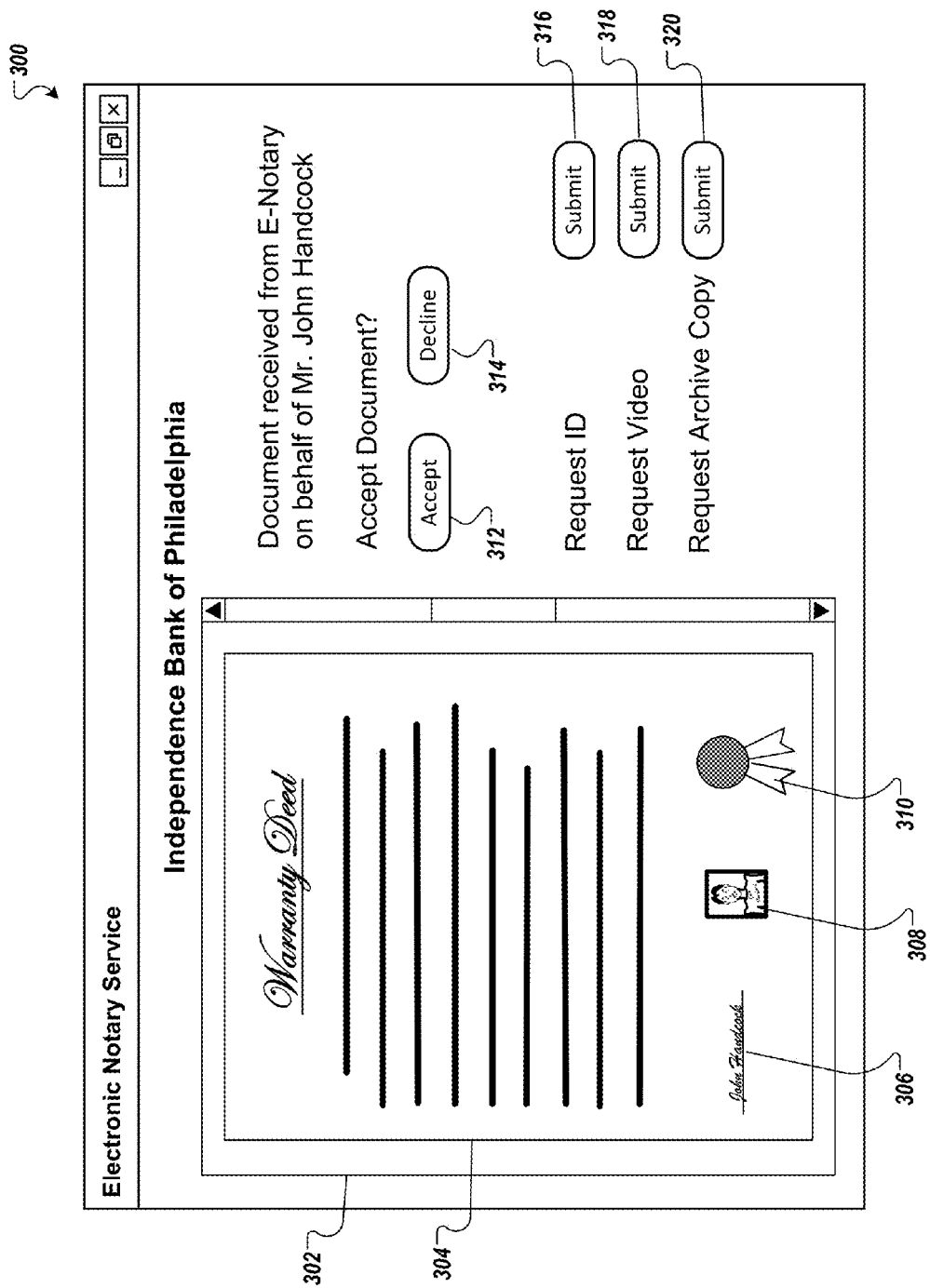
FIG. 3 illustrates an exemplary user interface for a third-party recipient of electronically notarized documents.

FIG. 3 illustrates an exemplary user interface 300 for a third-party recipient of electronically notarized documents. The user interface 300 may include a document viewing pane 302 for viewing an electronically notarized document 304. The electronically notarized document 304 may include a signature 306, a signed photograph 308 from the electronic notarization process, and an indication of notarization 310. In addition, the user interface 300 may include user selectable buttons to either accept 312 or refuse 314 the notarized document 304. Upon selection of either button 312 or 314 a message may be sent to a user who submitted the notarized document 304 indicating whether the third-party has accepted or refused the notarized document 304. Additional selectable buttons may be included to request from the notary server a copy of the submitted identification document 316, a copy of a video of a user performing the electronic document notarization submission 318, and/or a copy of the user submitted notarization data 320.

Figure 4:
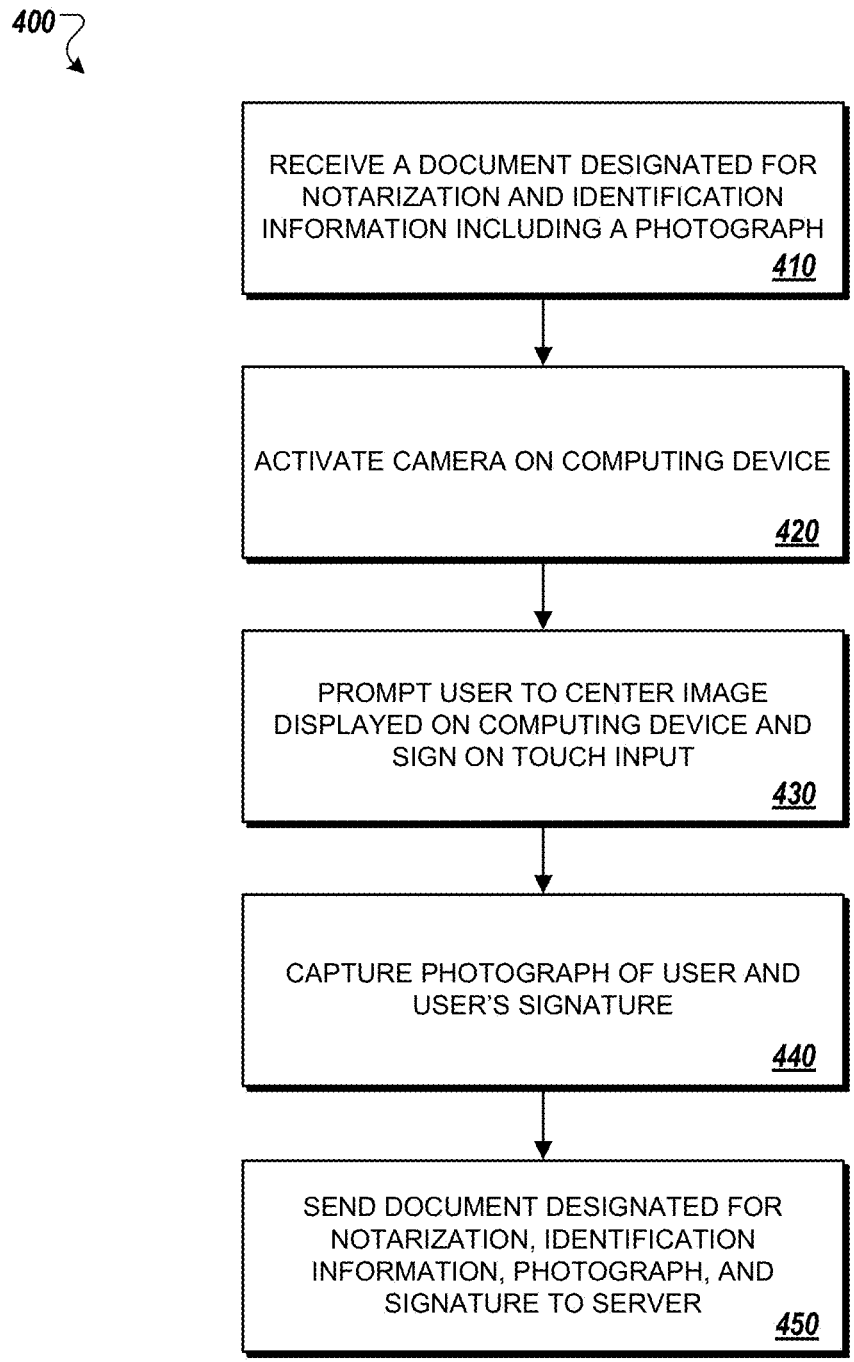
FIG. 4 is a flow chart of a process for receiving data by a notarization application.

FIG. 4 is a flow chart of a process 400 for receiving data by a notarization application. The process 400 may be performed by a computing device, such as, for example, mobile device 102, 202 of FIGS. 1A-1D and 2.

The computing device receives a document designated for notarization and identification information including a photograph (410). The identification information may be, for example, an identification document, such as a photo ID. Furthermore, document designated for notarization may be received when a user selects the document from a menu provided on the computing device or when a user takes a photograph of the document using a camera on the computing device, for example. Similarly, the identification information may be received when the user selects identification information from a menu provided on the computing device or when a user takes a photograph of the identification document.

The computing device activates a camera on the computing device (420) and prompts a user of the computing device to center an image displayed on the computing device from the camera on the user and to sign on a touch input of the computing device (430). In addition, the computing device may prompt the user to record a video of the user submitting the document, identification information, and signing on the touch input. Furthermore, to verify contemporaneousness of the video, the computing device may prompt the user to write a particular word received from a server while recording the video and signing on the touch input.

The computing device captures a photograph of the user and a signature of the user (440). The computing device may overlay the signature on the photograph. Finally, the computing device sends the document designated for notarization, the identification information, the photograph of the user, and the signature of the user to a server for notarization (450). In some implementations, the computing devices accesses location data (e.g., global position service data) indicating the location of the mobile device when the notarization data is sent to the server. In some implementations, the notarization data may be sent to the server in a secure data package, for example, by encrypting the data package, including a trusted time stamp (e.g., a digital postmark), and/or including a digital signature. In some implementations, a video may be included with the notarization data.

Figure 5:
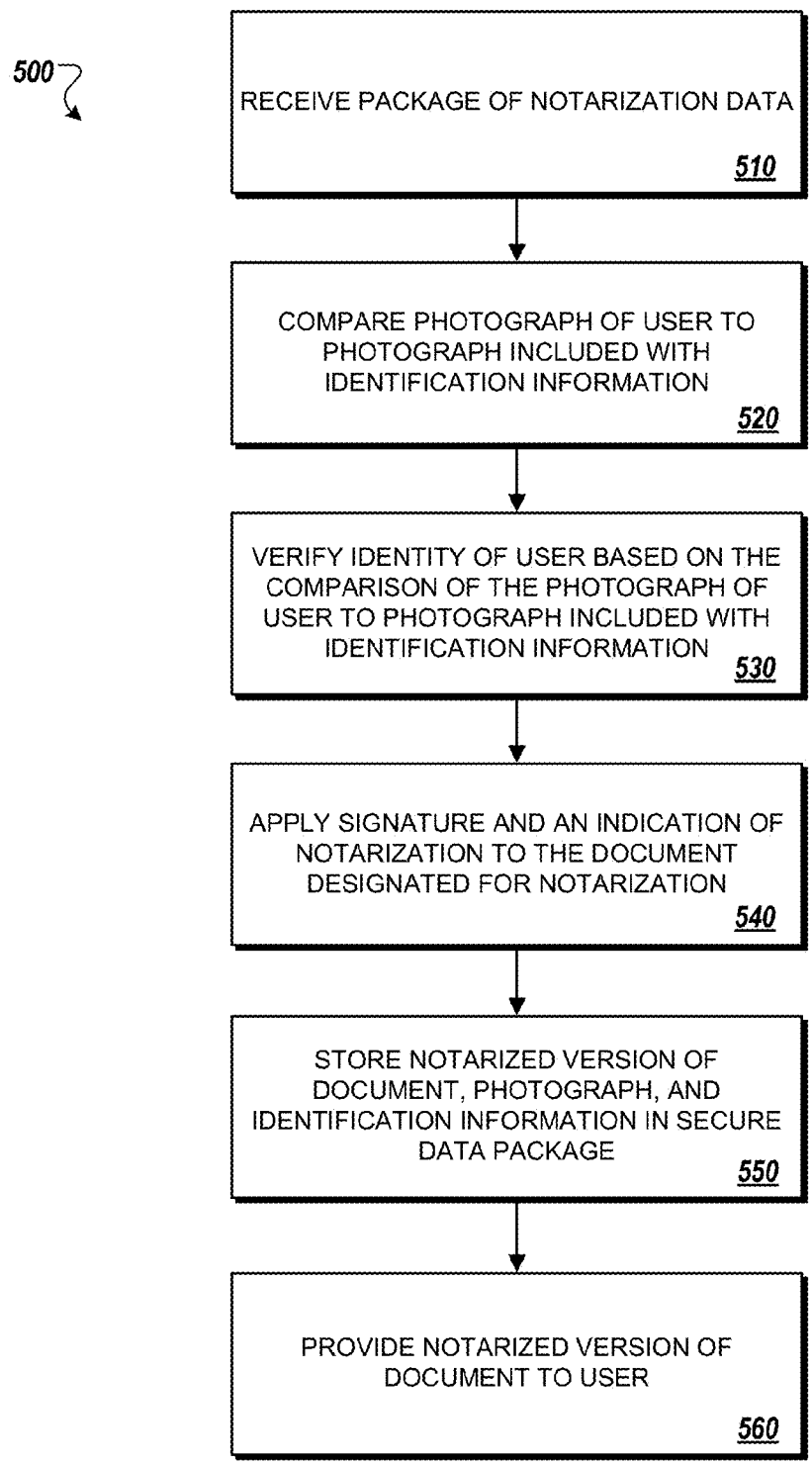
FIG. 5 is a flow chart of a process for electronically notarizing a document.

FIG. 5 is a flow chart of a process 500 for electronically notarizing a document. The process 500 may be performed by a computing device, such as, for example, notary server 206 of FIG. 2.

The server receives a package of notarization data (510) including: a document designated for notarization, identification information including a photograph, a photograph of a user, and a signature of the user. The identification information may be, for example, an image of an identification document, such as a photo ID. The signature of the user may be overlaid on the photograph of the user. In some implementations, the package of data may be in a secure data package, for example, by encrypting the data package, including a trusted time stamp (e.g., a digital postmark), and/or including a digital signature. In some implementations, a video may be included with the package of data. In some implementations, location data may be included in the package of data.

The server compares the photograph of the user to the photograph included with the identification information (520). The comparison may be performed by the server using, for example, facial recognition software. In some implementations, the photograph of the user and the identification information may be displayed to an employee (e.g., a notary public) in a data center on a display connected to the server. The employee may then perform the comparison and provide an input to the server indicating whether the employee agrees that the person represented in the photograph of the user is the same person as that represented in the identification information.

The server verifies an identity of the user based on the comparison of the photograph of the user to the photograph included with the identification information (530). The server may determine, based on a predetermined threshold of similarity, whether results from the comparison performed by the facial recognition software indicate that the identification information adequately identifies the user in the photograph of the user. If it is determined that the results of the comparison are inadequate, and thus, the user's identity is not verified, the server may refuse to notarize the document and send an appropriate message to the user's mobile device. Likewise, if the employee indicates that the person represented in the photograph is not the same as the person represented in the identification information, the server may refuse to notarize the document.

However, it is determined that the results of the comparison are adequate, and thus, the user's identity is verified, the server may notarize the document and send an appropriate message to the user's mobile device. Likewise, if the employee indicates that the person represented in the photograph is the same as the person represented in the identification information, the server may notarize the document.

Based on the results of the verification of the user's identity, the server applies the signature and an indication of notarization to the document designated for notarization (540), thereby notarizing the document. The indication of notarization may include the location data and/or a thumbnail version of the photograph of the user.

The server stores the notarized version of the document, the photograph, and the identification document in a secure data package (550). The secure data package may be archived in a notary database, for example, by encrypting the data package, storing with a trusted time stamp (e.g., a digital postmark), and/or storing with a digital signature. In some implementations, the user may record a video showing the user presenting the identification document and signing a touch input of the computing device. In such implementations the video also may be included in an archived secure data package.

The server provides the notarized version of the document to the user (560). The notarized version of the document may be provided to the user electronically, through the notarization application and/or via e-mail, physically through a document delivery service, or by both means. In some implementations, a copy of the notarized version of the document also may be provided to one or more third parties either electronically, physically, or both. When provided electronically, the notarized version of the document may be transmitted in a secure data package for example, by encrypting the data package, storing with a trusted time stamp (e.g., a digital postmark), and/or storing with a digital signature.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. It will be understood that various modifications may be made without departing from the spirit and scope. For example, advantageous results still could be achieved if steps of the disclosed techniques were performed in a different order and/or if components in the disclosed systems were combined in a different manner and/or replaced or supplemented by other components. Other implementations are within the scope of the description.

What is claimed is:

1. A computer implemented method comprising:
sending, by a server, a code-word to a computing device of a user in response to a request from the computing device to electronically notarize a document;
receiving, at the server, data including:
a document designated for notarization,
identification information including a photograph, and
a photograph of the user superimposed with a signature of the user;
comparing, by the server, the photograph of the user to the photograph included with the identification information;
verifying, by the server, an identity of the user based on the identification information and the photograph based on comparing the photograph of the user to the photograph included with the identification information;
verifying, by the server, a contemporaneousness of the photograph of the user with the signature of the user based on determining that the signature of the user includes the code-word;
in response to verifying the identity of the user and to verifying the contemporaneousness of the photograph of the user with the signature of the user, applying, to the document designated for notarization, the signature and an indication of notarization to create a notarized version of the document;
storing, by the server, the notarized version of the document, the photograph, and the identification document in a secure data package;
providing, to the computing device of the user, the notarized version of the document.

2. The method of claim 1, wherein the data includes location data.

3. The method of claim 1, wherein the data includes a video.

4. The method of claim 1, wherein the data is encrypted.

5. The method of claim 1, wherein the data includes a digital postmark.

6. The method of claim 1 further comprising:
accessing ID validation information from a database; and
determining that the identification information is valid.

7. The method of claim 6, wherein the database is a government issued ID database.

8. The method of claim 6, wherein the database is a social networking platform.

9. The method of claim 1, wherein the indication of notarization includes an indication of a level of certification.

10. The method of claim 1 further comprising providing the notarized version of the document to at least one third-party.

11. The method of claim 1, wherein the data includes GPS data indicating a location of the computing device, and wherein the method further comprises:
accessing ID validation information from a database; and
determining that the identification information is valid based on the ID validation information and the GPS data.

12. A system comprising:
one or more processors; and
a data store coupled to the one or more processors having instructions stored thereon which, when executed by the one or more processors, causes the one or more processors to perform operations comprising:
sending a code-word to a computing device of a user in response to a request from the computing device to electronically notarize a document;
receiving data including:
a document designated for notarization,
identification information including a photograph, and
a photograph of the user superimposed with a signature of the user;
comparing the photograph of the user to the photograph included with the identification information;
verifying an identity of the user based on the identification information and the photograph based on comparing the photograph of the user to the photograph included with the identification information;
verifying a contemporaneousness of the photograph of the user with the signature of the user based on determining that the signature of the user includes the code-word;
in response to verifying the identity of the user and to verifying the contemporaneousness of the photograph of the user with the signature of the user, applying, to the document designated for notarization, the signature and an indication of notarization to create a notarized version of the document;
storing the notarized version of the document, the photograph, and the identification document in a secure data package;
providing, to the computing device of the user, the notarized version of the document.

13. The system of claim 12, wherein the operations further comprise:
accessing ID validation information from a database; and
determining that the identification information is valid.

14. The system of claim 12, wherein the indication of notarization includes an indication of a level of certification.

15. The system of claim 12, wherein the operations further comprise providing the notarized version of the document to at least one third-party.

16. The system of claim 12, wherein the data includes GPS data indicating a location of the computing device, and wherein the operations further comprises:
accessing ID validation information from a database; and
determining that the identification information is valid based on the ID validation information and the GPS data.

17. A non-transitory computer readable medium storing instructions that, when executed by at least one processor, cause the at least one processor to perform operations comprising:
sending a code-word to a computing device of a user in response to a request from the computing device to electronically notarize a document;
receiving data including:
a document designated for notarization,
identification information including a photograph, and
a photograph of the user superimposed with a signature of the user;
comparing the photograph of the user to the photograph included with the identification information;
verifying an identity of the user based on the identification information and the photograph based on comparing the photograph of the user to the photograph included with the identification information;
verifying a contemporaneousness of the photograph of the user with the signature of the user based on determining that the signature of the user includes the code-word;
in response to verifying the identity of the user and to verifying the contemporaneousness of the photograph of the user with the signature of the user, applying, to the document designated for notarization, the signature and an indication of notarization to create a notarized version of the document;
storing the notarized version of the document, the photograph, and the identification document in a secure data package;
providing, to the computing device of the user, the notarized version of the document.

18. The medium of claim 17, wherein the operations further comprise:
accessing ID validation information from a database; and
determining that the identification information is valid.

19. The medium of claim 17, wherein the indication of notarization includes an indication of a level of certification.

20. The medium of claim 17, wherein the data includes GPS data indicating a location of the computing device, and wherein the operations further comprises:
accessing ID validation information from a database; and
determining that the identification information is valid based on the ID validation information and the GPS data.

* * * * *